US009003120B2

(12) United States Patent
Huang (10) Patent No.: US 9,003,120 B2
(45) Date of Patent: Apr. 7, 2015

(54) METHOD AND APPARATUS FOR QUERYING FOR AND TRAVERSING VIRTUAL MEMORY AREA

(71) Applicant: Huawei Technologies Co., Ltd., Shenzhen, Guangdong (CN)

(72) Inventor: Qiang Huang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/192,094

(22) Filed: Feb. 27, 2014

(65) Prior Publication Data

US 2014/0181401 A1  Jun. 26, 2014

Related U.S. Application Data

(63) Continuation of application No. PCT/CN2011/079293, filed on Sep. 2, 2011.

(51) Int. Cl.
*G06F 12/08* (2006.01)
*G06F 12/10* (2006.01)

(52) U.S. Cl.
CPC .......... *G06F 12/0802* (2013.01); *G06F 12/109* (2013.01); *G06F 12/1036* (2013.01); *G06F 2212/657* (2013.01)

(58) Field of Classification Search
CPC .............................. G06F 12/0802; G06F 12/08
USPC ........................................................ 711/118
See application file for complete search history.

(56) References Cited

U.S. PATENT DOCUMENTS

2010/0223432 A1  9/2010  Eidus et al.

FOREIGN PATENT DOCUMENTS

| CN | 101162469 A | 4/2008 |
|----|-------------|--------|
| CN | 101329686 A | 12/2008 |
| CN | 102024020 A | 4/2011 |

OTHER PUBLICATIONS

Enamul Hag, et al., "Parallel Algorithms for Balancing Threaded Binary Search Trees", Proceedings of the Annual International Phoenix Conference on Computers and Communications, Mar. 22, 1989, p. 286-290.
Gustavo Duarte, "How the Kernel Manages Your Memory", Feb. 4, 2009, 6 pages.
Haiyang, Zhang, "Red-Black Tree Used for Arranging Virtual Memory Area of Linux", Journal of Suzhou College, vol. 25, No. 8, Aug. 2010, p. 50-53.

*Primary Examiner* — Jasmine Song (57) ABSTRACT

Embodiments of the present invention disclose a method and an apparatuses for querying for and traversing a virtual memory area. The method includes: determining whether a virtual memory area (vma) corresponding to a query address is in an adjacent range of a cached vma, and if the vma corresponding to the query address is in the adjacent range of the cached vma, querying for the vma by using a thread on a node of a threaded red-black tree. Since an adjacent range of the cached vma can always be determined, the hit rate of accessing the cache is improved, and the time complexity of implementing the whole vma traversal is O(n), thereby improving vma query efficiency.

18 Claims, 6 Drawing Sheets

FIG. 10

METHOD AND APPARATUS FOR QUERYING FOR AND TRAVERSING VIRTUAL MEMORY AREA

CROSS-REFERENCE TO RELATED APPLICATIONS

This application is a continuation of International Application No. PCT/CN2011/079293, filed on Sep. 2, 2011, which is hereby incorporated by reference in its entirety.

TECHNICAL FIELD

The present invention relate to a communications technology, and in particular, to a method and an apparatus for querying for and traversing a virtual memory area.

BACKGROUND

Currently, in a Linux technology, a virtual memory area (virtual memory area, vma for short hereinafter) is generally queried for by using a red-black tree.

Specifically, in a process of querying for an $n^{th}$ vma, a query function find_vma obtains a read semaphore of memory description information (mm); determines, starting from an address m, whether a vma corresponding to the address m is in an address range of a cached vma; and if yes, that is, if this query hits the cache, queries for the vma corresponding to the address m by accessing the cached vma, and releases the read semaphore; or if no, queries for the vma corresponding to the address m in a conventional manner of traversing a red-black tree starting from a root node, and releases the read semaphore.

When the query function find_vma does not hit the cache, the vma must be queried for by traversal starting from the root node. As a result, the query efficiency in the prior art is low.

SUMMARY

Embodiments of the present invention provide a method and an apparatus for querying for and traversing a virtual memory area, so as to improve vma query efficiency.

An embodiment of the present invention provides a method for querying for a virtual memory area, including:

determining whether a virtual memory area vma corresponding to a query address is in an adjacent range of a cached vma, where the adjacent range of the cached vma includes an address range of at least one adjacent vma before the cached vma and an address range of at least one adjacent vma after the cached vma; and if the virtual memory area vma corresponding to the query address is in the adjacent range of the cached vma, querying for the vma by using a thread on a node of a threaded red-black tree, where the node is a node corresponding to the cached vma, and the thread is a pointer pointing to a predecessor node and a successor node of each node on the threaded red-black tree.

An embodiment of the present invention further provides a method for traversing a virtual memory area, including:

obtaining a read semaphore of memory description information mm, and determining whether a vma corresponding to a query address n is in an adjacent range of a cached vma, where the adjacent range of the cached vma includes an address range of at least one adjacent vma before the cached vma and an address range of at least one adjacent vma after the cached vma;

if the virtual memory area vma corresponding to the query address is in the adjacent range of the cached vma, querying for the vma corresponding to the query address n by using a thread on a node of a threaded red-black tree, and releasing the read semaphore, where the node is a node corresponding to the cached vma, and the thread is a pointer pointing to a predecessor node and a successor node of each node on the threaded red-black tree;

updating an address range of the current cached vma to an address range (vma_start, vma_end) of the vma corresponding to the query address n, and updating a query address n+1 to the vma_end of the vma corresponding to the query address n, where the vma_start is a start address of the vma corresponding to the query address n, and the vma_end is an end address of the vma corresponding to the query address n;

obtaining the read semaphore of the mm, determining that a vma corresponding to the query address n+1 is an adjacent vma after the current cached vma, querying for a successor node of the current cached vma by using a thread on the node of the threaded red-black tree, and querying for the vma corresponding to the query address n+1 according to the successor node; and repeating the steps cyclically until at least a part of address space is traversed.

An embodiment of the present invention further provides an apparatus for querying for a virtual memory area, including:

a determining module, configured to determine whether a virtual memory area vma corresponding to a query address is in an adjacent range of a cached vma, where the adjacent range of the cached vma includes an address range of at least one adjacent vma before the cached vma and an address range of at least one adjacent vma after the cached vma; and a thread query module, configured to: when the determining module determines that the vma is in the adjacent range of the cached vma, query for the vma by using a thread on a node of a threaded red-black tree, where the node is a node corresponding to the cached vma, and the thread is a pointer pointing to a predecessor node and a successor node of each node on the threaded red-black tree.

An embodiment of the present invention further provides an apparatus for traversing a virtual memory area, including:

a determining module, configured to determine whether a virtual memory area vma corresponding to a query address n is in an adjacent range of a cached vma, where the adjacent range of the cached vma includes an address range of at least one adjacent vma before the cached vma and an address range of at least one adjacent vma after the cached vma;

a thread query module, configured to: when the determining module determines that the vma is in the adjacent range of the cached vma, query for the vma by using a thread on a node of a threaded red-black tree, where the node is a node corresponding to the cached vma, and the thread is a pointer pointing to a predecessor node and a successor node of each node on the threaded red-black tree; and a cache update module, configured to: according to the vma that is corresponding to the query address n and that is queried for by the thread query module, update the current cached vma to an address range (vma_start, vma_end) of the vma corresponding to the query address n, and update a query address n+1 to the vma_end of the vma corresponding to the query address n, where the vma_start is a start address of the vma corresponding to the query address n, and the vma_end is an end address of the vma corresponding to the query address n.

In the embodiments of the present invention, by setting an adjacent vma range for each vma in address space in advance and extending a prior art red-black tree to a threaded red-black tree, it is further determined whether a vma corresponding to a query address is in an adjacent range of a cached vma, in addition to determining, in the prior art, whether the vma corresponding to the query address is the cached vma. By using the method for traversing a vma according to the embodiments of the present invention, it is ensured that an adjacent vma of the cached vma can always be determined when the address space is traversed, that is, it is determined that the vma corresponding to the query address is always an adjacent vma of the cached vma, and the vma corresponding to the query address can always be queried for by using a thread on a node of the threaded red-black tree. Therefore, the cache hit rate of querying for a vma is improved, thereby improving vma query efficiency.

BRIEF DESCRIPTION OF THE DRAWINGS

To describe the technical solutions according to the embodiments of the present invention or in the prior art more clearly, the following briefly introduces the accompanying drawings for describing the embodiments or the prior art. Apparently, the accompanying drawings in the following description show merely some embodiments of the present invention, and a person of ordinary skill in the art may still derive other drawings from the accompanying drawings without creative efforts.

DETAILED DESCRIPTION

To make the objectives, technical solutions, and advantages of the present invention more comprehensible, the following clearly describes the technical solutions according to the embodiments of the present invention with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the prior art, a vma corresponding to a specified address is generally searched for by querying a red-black tree. In the following, a prior art method for querying for a vma is described in detail by using a vma corresponding to a query address 0 as an example. The method specifically includes:

determining whether the vma corresponding to the address 0 is in an address range of a cached vma; and if yes, querying for the vma corresponding to the address 0 by accessing the cached vma; or if no, querying for the vma corresponding to the address 0 in a conventional manner of traversing a red-black tree starting from a root node.

If it is required to traverse n vmas, that is, query for n vmas, the current cached vma needs to be updated according to the vma corresponding to the query address 0. Specifically, the address range of the current cached vma is updated to an address range (vma_start, vma_end) of the vma corresponding to the address 0, and a query address of a vma corresponding to an address 1 (a next vma) is updated to the vma_end of the vma corresponding to the address 0 (the previous vma). Therefore, when it is determined whether the vma corresponding to the address 1 is the cached vma (the vma corresponding to the address 0), it can definitely be determined that the vma corresponding to the address 1 is not in the address range of the cached vma (the vma corresponding to the address 0). By analogy, when a vma corresponding to a subsequent new address is queried for, it can also be determined that the vma corresponding to the subsequent new address is not in the address range of the cached vma (the previous vma) after updating, that is, the cache hit rate is almost 0. Therefore, it is always required to query for a vma corresponding to a new address in the conventional manner of traversing a red-black tree starting from a root node.

It can be seen from the technical solution disclosed in the prior art the prior art at least has the following problems:

When a vma is traversed by querying a red-black tree in the prior art, each time a vma corresponding to a new address is queried for, the current cached vma is updated to a vma corresponding to a previous query address. Therefore, when a next new vma is queried for, it can be determined that the next new vma is definitely not in the address range of the cached vma after updating, that is, the hit rate in accessing a cache in the vma red-black tree is almost 0. If it is required to traverse n vmas, which is in fact a process of querying for a vma for n times in the conventional manner of querying a red-black tree starting from a root node, since the time complexity of each time querying for a vma in the conventional manner of traversing a red-black tree starting from a root node is O(log n), the time complexity of the whole traversal becomes O(n log n), which undoubtedly increases the time complexity of vma traversal. Therefore, efficiency of traversing a vma by querying a red-black tree in the prior art is low.

In view of the problems existing in the prior art, the embodiments of the present invention provide the following technical solutions, which can improve the hit rate in accessing a cache, thereby improving vma query efficiency.

Figure 1:
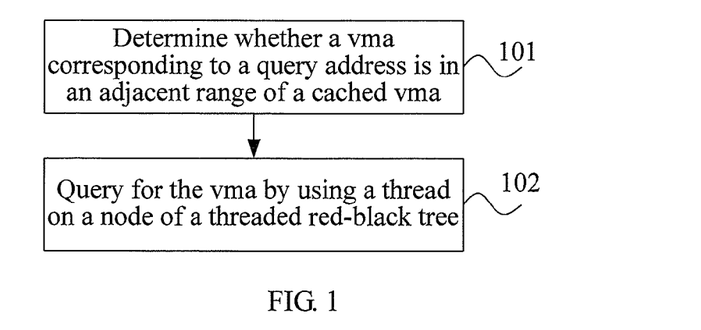
FIG. 1 is a flowchart of a method for querying for a virtual memory area according to Embodiment 1 of the present invention.

FIG. 1 is a flowchart of a method for querying for a virtual memory area according to Embodiment 1 of the present invention. As shown in FIG. 1, the method in this embodiment may include:

Step 101: Determine whether a virtual memory area vma corresponding to a query address is in an adjacent range of a cached vma, where the adjacent range of the cached vma includes an address range of at least one adjacent vma before the cached vma and an address range of at least one adjacent vma after the cached vma.

Step 102: If the virtual memory area vma corresponding to the query address is in the adjacent range of the cached vma, query for the vma by using a thread on a node of a threaded red-black tree, where the node is a node corresponding to the cached vma, and the thread is a pointer pointing to a predecessor node and a successor node of each node on the threaded red-black tree.

In the foregoing steps, if it is determined that the vma corresponding to the query address happens to be the cached vma, the vma corresponding to the query address is queried for directly by accessing the cached vma. If not, it is further determined whether the vma corresponding to the query address is in the adjacent range of the cached vma. If it is determined that the vma corresponding to the query address is an adjacent vma before the cached vma, a predecessor node of the cached vma is found by using the thread on the node of the threaded red-black tree, and the vma corresponding to the query address is queried for according to the predecessor node. If it is determined that the vma corresponding to the query address is an adjacent vma after the cached vma, a successor node of the cached vma is found by using the thread on the node of the threaded red-black tree, and the vma corresponding to the query address is queried for according to the successor node.

In this embodiment, by determining an adjacent range of a cached vma and extending a prior art red-black tree to a threaded red-black tree, it is further determined whether a vma corresponding to a query address is in the adjacent range of the cached vma, in addition to determining, in the prior art, whether the vma corresponding to the query address is the cached vma. If it is determined that the vma corresponding to the query address is an adjacent vma of the cached vma, the vma corresponding to the query address is searched for by using a thread on a node of the threaded red-black tree. Compared with the prior art method in which it is only determined whether a vma corresponding to a query address is a cached vma, the hit rate in accessing a cache is improved to some extent, thereby improving vma query efficiency.

The foregoing technical solution shown in FIG. 1 is described in detail in the following by using a specific embodiment.

Figure 2:
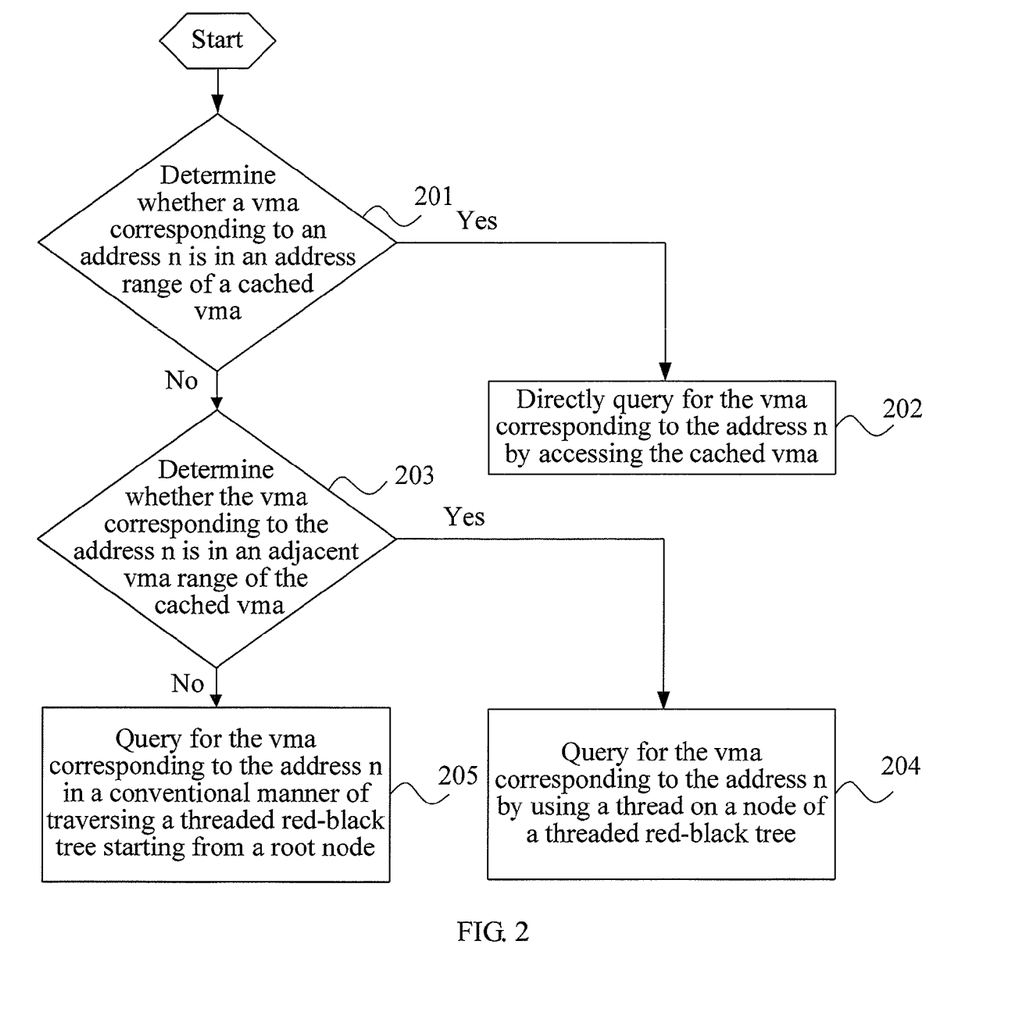
FIG. 2 is a flowchart of a method for querying for a virtual memory area according to Embodiment 2 of the present invention.
Figure 3:
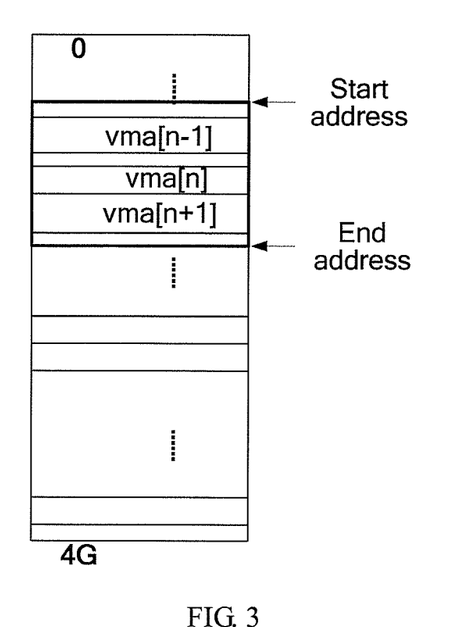
FIG. 3 is a schematic structural diagram of an adjacent vma range provided in Embodiment 2 of the present invention.
Figure 4:
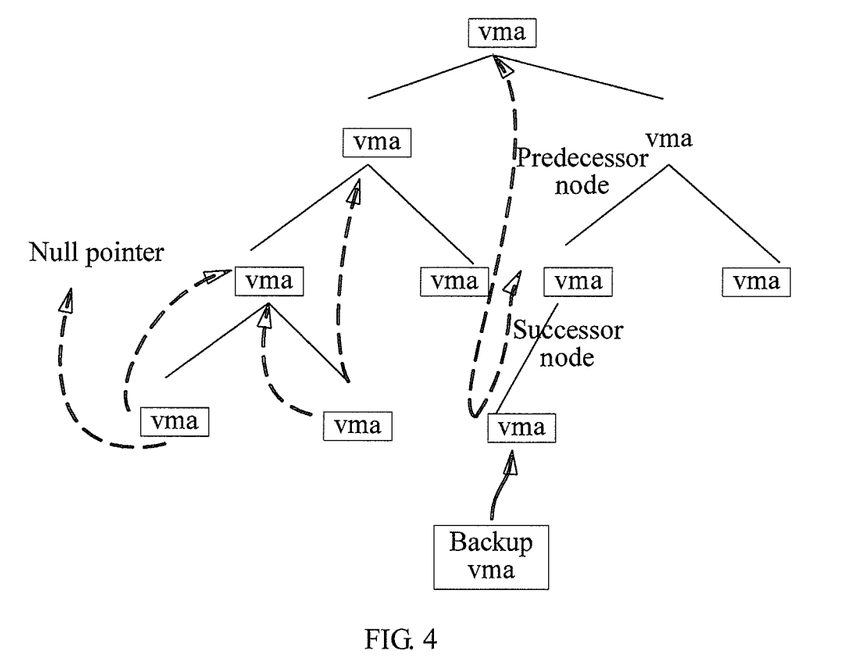
FIG. 4 is a schematic structural diagram of a threaded red-black tree provided in Embodiment 2 of the present invention.

FIG. 2 is a flowchart of a method for querying for a virtual memory area according to Embodiment 2 of the present invention, FIG. 3 is a schematic structural diagram of an adjacent vma range provided in Embodiment 2 of the present invention, and FIG. 4 is a schematic structural diagram of a threaded red-black tree provided in Embodiment 2 of the present invention. As shown in FIG. 2 to FIG. 4, the method in this embodiment may include:

Step 201: Obtain a read semaphore of memory description information (mm), and determine whether a vma corresponding to an address n is in an address range of a cached vma; and if yes, perform step 202; or if no, perform step 203.

Step 202: Directly query for the vma corresponding to the address n by accessing the cached vma, and release the read semaphore.

Step 203: Determine whether the vma corresponding to the address n is in an adjacent range of the cached vma; and if yes, perform step 204; or if no, perform step 205.

In this step, the adjacent range of the cached vma provided in Embodiment 2 of the present invention includes an address range of at least one adjacent vma before the cached vma and an address range of at least one adjacent vma after the cached vma. A schematic diagram of the adjacent range of the cached vma is shown in FIG. 3. The address range of a vma is a half-open range, that is, vma_end is not in the address range of the vma; therefore, when the adjacent range of the cached vma is being set, an end address of an adjacent vma that precedes an adjacent vma before the cached vma is used as a start address in the adjacent range of the cached vma, and an end address of an adjacent vma after the cached vma is used as an end address of the adjacent range in the cached vma.

When it is required to determine whether the vma corresponding to the query address n is in the adjacent range of the cached vma, it may be determined whether the query address n is in an address range of an adjacent vma of the cached vma. If the query address n is between the end address of the adjacent vma that precedes the adjacent vma before the cached vma and an end address of the adjacent vma before the cached vma, it is determined that the vma corresponding to the query address n is the adjacent vma before the cached vma. If the query address n is between an end address of the cached vma and the end address of the adjacent vma after the cached vma, it is determined that the vma corresponding to the query address n is the adjacent vma after the cached vma.

It should be noted herein that the method for determining an adjacent vma of the cached vma by determining whether the query address n is in the address range of the adjacent vma of the cached vma is merely one of implementation solutions, but the determining the adjacent range of the cached vma is not limited to this solution.

Step 204: Query for the vma corresponding to the address n by using a thread on a node of a threaded red-black tree.

In this step, a schematic structural diagram of the threaded red-black tree provided in Embodiment 2 of the present invention is shown in FIG. 4. By adding, at each vma node on a vma red-black tree in the prior art, a thread pointing to a predecessor node and a successor node of each vma node, the prior art red-black tree is extended to a threaded red-black tree, where the thread is a pointer pointing to a predecessor node and a successor node of each node on the threaded red-black tree.

If it is determined that the vma corresponding to the query address n is the adjacent vma before the cached vma, a predecessor node of the cached vma is found by using the thread on the node of the threaded red-black tree, the vma corresponding to the address n is queried for according to the predecessor node, and the read semaphore is released. If it is determined that the vma corresponding to the address n is the adjacent vma after the cached vma, a successor node of the cached vma is found by using the thread on the node of the threaded red-black tree, the vma corresponding to the address n is queried for according to the successor node, and the read semaphore is released.

Step 205: Query for the vma corresponding to the address n in a conventional manner of traversing a threaded red-black tree starting from a root node, and release the read semaphore.

In this embodiment, by setting an adjacent range of a cached vma in advance and extending a prior art red-black tree to a threaded red-black tree, it is further determined whether a vma corresponding to a query address is in the adjacent range of the cached vma, in addition to determining, in the prior art, whether the vma corresponding to the query address is the cached vma. If it is determined that the vma corresponding to the query address is an adjacent vma of the cached vma, the vma corresponding to the query address is searched for by using a thread on a node of a threaded red-black tree. Compared with the prior art method in which it is only determined whether a vma corresponding to a query address is a cached vma, the hit rate in accessing a cache is improved to some extent, thereby improving vma query efficiency. In addition, in this embodiment, since the read semaphore needs to be released when the vma corresponding to the address n is queried for, it is ensured that when the vma is queried for, another operation except a read operation on the vma may be performed on the vma, for example, the vma may be modified.

Figure 5:
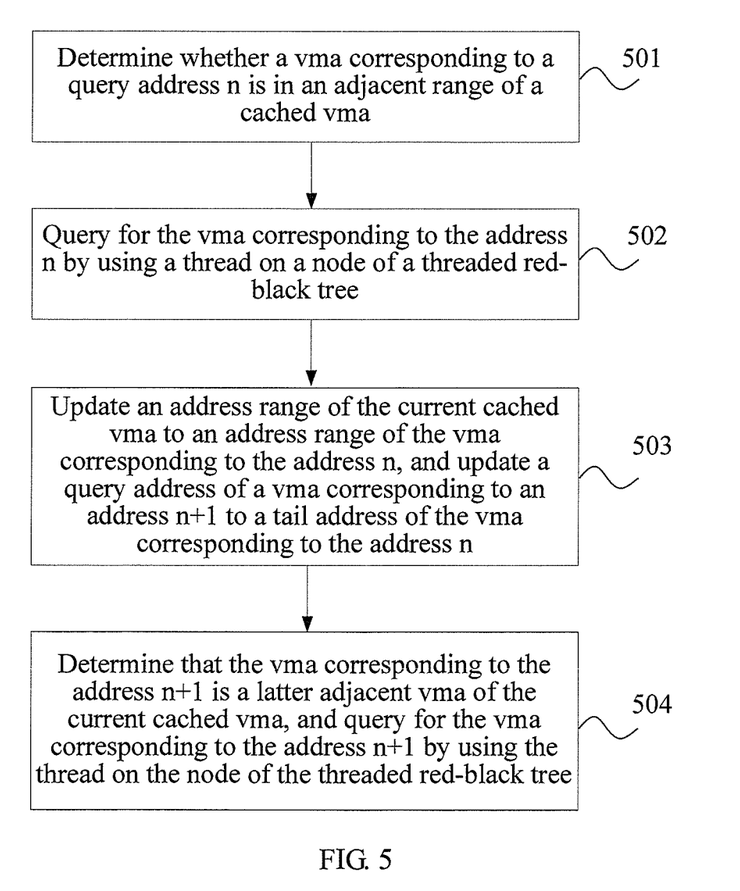
FIG. 5 is a flowchart of a method for traversing a virtual memory area according to Embodiment 1 of the present invention.

FIG. 5 is a flowchart of a method for traversing a virtual memory area according to Embodiment 1 of the present invention. As shown in FIG. 5, the method in this embodiment may include:

Step 501: Obtain a read semaphore of memory description information mm, and determine whether a vma corresponding to a query address n is in an adjacent range of a cached vma.

The adjacent range of the cached vma includes an address range of at least one adjacent vma before the cached vma and an address range of at least one adjacent vma after the cached vma.

Step 502: If the virtual memory area vma corresponding to the query address is in the adjacent range of the cached vma, query for the vma corresponding to the query address n by using a thread on a node of a threaded red-black tree, and release the read semaphore, where the node is a node corresponding to the cached vma, and the thread is a pointer pointing to a predecessor node and a successor node of each node on the threaded red-black tree.

In this step, if it is determined that the vma corresponding to the query address happens to be the cached vma, the vma corresponding to the query address is directly queried for by accessing the cached vma. If not, it is further determined whether the vma corresponding to the query address n is in the adjacent range of the cached vma. If it is determined that the vma corresponding to the query address n is an adjacent vma before the cached vma, a predecessor node of the cached vma is found by using the thread on the node of the threaded red-black tree, and the vma corresponding to the query address n is queried for according to the predecessor node. If it is determined that the vma corresponding to the query address n is an adjacent vma after the cached vma, a successor node of the cached vma is found by using the thread on the node of the threaded red-black tree, and the vma corresponding to the query address n is queried for according to the successor node.

Step 503: Update an address range of the current cached vma to an address range (vma_start, vma_end) of the vma corresponding to the query address n, and update a query address of a vma corresponding to an address n+1 to the vma_end of the vma corresponding to the query address n, where the vma_start is a start address of the vma corresponding to the query address n, and the vma_end is an end address of the vma corresponding to the query address n.

Step 504: Obtain the read semaphore of the mm, determine that the vma corresponding to the query address n+1 is an adjacent vma after the current cached vma, query for a successor node of the current cached vma by using a thread on a node of the threaded red-black tree, and query for the vma corresponding to the query address n+1 according to the successor node.

Repeat the foregoing steps cyclically until at least a part of address space is traversed.

In this embodiment, by setting an adjacent range of a cached vma in advance and extending a prior art red-black tree to a threaded red-black tree, when it is determined that a vma corresponding to a query address n is an adjacent vma of the cached vma, the vma corresponding to the query address n is queried for by using a thread on a node of the threaded red-black tree, the current cached vma is updated to the vma corresponding to the address n, and a query address of a vma corresponding to an address n+1 is updated to an address range of the cached vma after updating (the vma corresponding to the address n). Due to the setting of the adjacent range of the cached vma, it can undoubtedly be determined that the vma corresponding to the address n+1 is an adjacent vma after the cached vma (the vma corresponding to the address n). The foregoing steps are repeated, and by analogy, a vma corresponding to a next address is always an adjacent vma after a cached vma (a vma corresponding to a previous address). Therefore, the vma can be queried for by using the thread on the node of the threaded red-black tree. Compared with the prior art in which the hit rate in accessing a cache is almost 0, the method for traversing a vma according to this embodiment of the present invention increases the hit rate in accessing a cache to almost 100%, and therefore vma traversal efficiency is improved.

In addition, the application of this embodiment of the present invention is not limited to traversal of all vmas, and the method provided in this embodiment of the present invention may be used to traverse vmas corresponding to any consecutive addresses in address space. For example, an adjacent vma range is set in advance for each of the vmas corresponding to consecutive addresses n+m in the address space, where the setting of the adjacent vma range is as described in the foregoing, and details are not described here again. When vma traversal is performed, firstly, the vma corresponding to the address n is queried for by using the technical solution provided in this embodiment of the present invention, and then the accessed cached vma and a search address of a vma corresponding to a next address are updated. Since the vma corresponding to the next address is always an adjacent vma after a cached vma (the previous vma), each of the vmas corresponding to the consecutive addresses n+m can always be queried for by using a thread on a node of a threaded red-black tree until the traversal of the vmas corresponding to the consecutive addresses n+m is completed.

Figure 6:
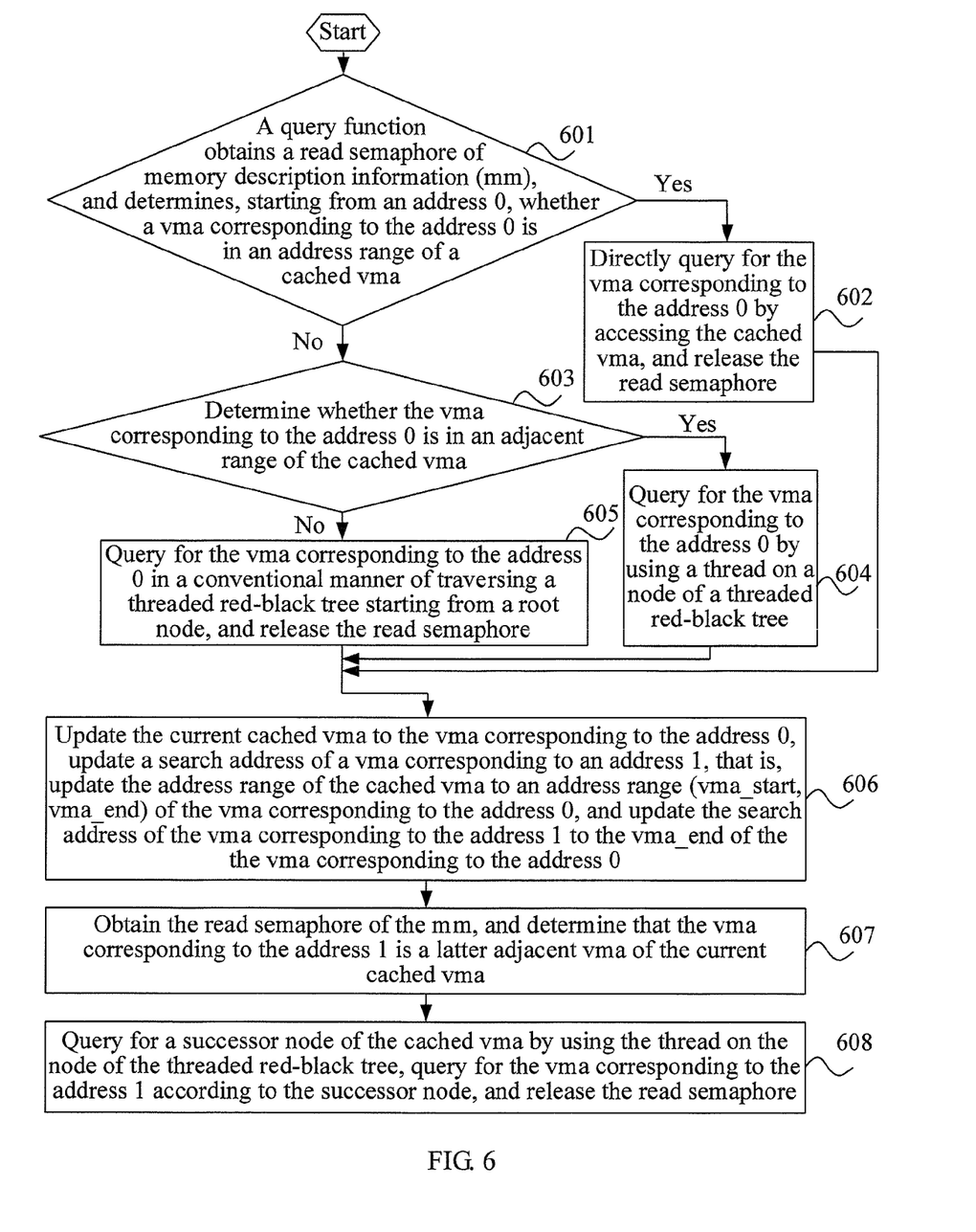
FIG. 6 is a flowchart of a method for traversing a virtual memory area according to Embodiment 2 of the present invention.

FIG. 6 is a flowchart of a method for traversing a virtual memory area according to Embodiment 2 of the present invention. As shown in FIG. 6, the method in this embodiment may include:

Step 601: A query function obtains a read semaphore of memory description information (mm), and determines, starting from an address 0, whether a vma corresponding to the address 0 is in an address range of a cached vma; and if yes, perform step 602; or if no, perform step 603.

Step 602: Directly query for the vma corresponding to the address 0 by accessing the cached vma, and release the read semaphore.

Step 603: Determine whether the vma corresponding to the address 0 is in an adjacent range of the cached vma; and if yes, perform step 604; or if no, perform step 605.

In this step, the adjacent range of the cached vma provided in Embodiment 2 of the present invention includes an address range of at least one adjacent vma before the cached vma and an address range of at least one adjacent vma after the cached vma. A schematic diagram of the adjacent range of the cached vma is shown in FIG. 3, and details are not described here again.

Step 604: Query for the vma corresponding to the query address 0 by using a thread on a node of a threaded red-black tree.

A schematic structural diagram of the threaded red-black tree used in this step is shown in FIG. 4, and details are not described here again.

If it is determined that the vma corresponding to the query address 0 is an adjacent vma before the cached vma, a predecessor node of the cached vma is found by using the thread on the node of the threaded red-black tree, the vma corresponding to the address 0 is queried for according to the predecessor node, and the read semaphore is released. If it is determined that the vma corresponding to the address 0 is an adjacent vma after the cached vma, a successor node of the cached vma is found by using the thread on the node of the threaded red-black tree, the vma corresponding to the address 0 is queried for according to the successor node, and the read semaphore is released.

Step 605: Query for the vma corresponding to the address 0 in a conventional manner of traversing a threaded red-black tree starting from a root node, and release the read semaphore.

Step 606: Update the current cached vma to the vma corresponding to the address 0, update a search address of a vma corresponding to an address 1, that is, update the address range of the cached vma to an address range (vma_start, vma_end) of the vma corresponding to the address 0, and update the search address of the vma corresponding to the address 1 to the vma_end of the vma corresponding to the address 0.

Step 607: Obtain the read semaphore of the mm, and determine that the vma corresponding to the address 1 is an adjacent vma after the current cached vma.

Step 608: Query for a successor node of the cached vma by using a thread on the node of the threaded red-black tree, query for the vma corresponding to the address 1 according to the successor node, and release the read semaphore.

Repeat the steps cyclically until the whole address space is traversed.

It can be known from the foregoing steps that an adjacent vma range is set in advance for each vma in address space, and a thread is added at each vma node on a threaded red-black tree, where the thread is a pointer pointing to a predecessor node and a successor node of each node on the threaded red-black tree; therefore, when it is determined whether the vma corresponding to the address 1 is an adjacent vma of the cached vma after updating, since the cached vma after updating has become the vma corresponding to the address 0, it can undoubtedly be determined that the vma corresponding to the address 1 is an adjacent vma after the vma corresponding to the address 0. In this case, a successor node of the cached vma (the vma corresponding to the address 0) is found by using a thread on a node of the threaded red-black tree, and the vma corresponding to the address 1 is queried for according to the successor node. Then, the accessed cache is updated to an address range of the vma corresponding to the address 1 according to the vma corresponding to the address 1, a search address of a vma corresponding to an address 2 is updated to the vma_end of the vma corresponding to the address 1, and the vma corresponding to the address 2 is queried for. By analogy, if it is required to traverse n vmas, due to the setting of an adjacent vma range and the extension of the threaded red-black tree, an adjacent vma of the cached vma can always be determined, and a next vma can always be queried for by using a thread on a node of the threaded red-black tree.

However, in the prior art, when a vma is traversed by querying a red-black tree, it is only determined whether a vma corresponding to a query address is an address range of a cached vma. Since the cached vma after updating is always a previous vma of the vma corresponding to the query address, it can undoubtedly be determined that the vma corresponding to the query address is definitely not in the address range of the cached vma after updating, that is, the hit rate in accessing a cache in the vma red-black tree is almost 0, and the hit efficiency when accessing the cache is low. If n vmas are traversed by using a red-black tree, since the hit rate of accessing a cache is 0, the process of querying for n vmas is in fact a process of querying for a vma for n times in a conventional manner of querying a red-black tree starting from a root node. Since the time complexity of querying for a vma in the conventional manner of traversing a red-black tree starting from a root node each time is 0 (log n), the time complexity of the whole traversal becomes 0 (n log n) which undoubtedly increases the time complexity of vma traversal.

Therefore, when address space is traversed by using the method for traversing a virtual memory area according to this embodiment of the present invention, since an adjacent vma of a cached vma can always be determined, an address in the whole adjacent range of the cached vma can be hit, and the vma corresponding to the query address can always be found by using a thread on a node of a threaded red-black tree, so that the time complexity of the whole traversal process is decreased to O(n), thereby improving vma query efficiency. In addition, since the read semaphore needs to be released in the process of querying for each vma by using the method provided in this embodiment of the present invention, it is ensured that when another operation except a read operation needs to be performed on a vma in the traversal process, the vma traversal can always be performed by using the method provided in this embodiment of the present invention.

Figure 7:
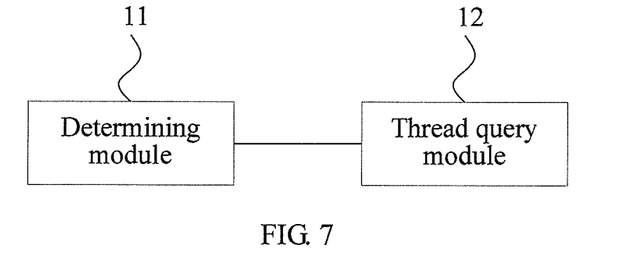
FIG. 7 is a schematic structural diagram of an apparatus for querying for a virtual memory area according to Embodiment 1 of the present invention.

FIG. 7 is a schematic structural diagram of Embodiment 1 of an apparatus for querying for a virtual memory area according to the present invention. As shown in FIG. 7, the apparatus in this embodiment may include a determining module 11 and a thread query module 12, where:

the determining module 11 is configured to determine whether a virtual memory area vma corresponding to a query address is in an adjacent range of a cached vma, where the adjacent range of the cached vma includes an address range of at least one adjacent vma before the cached vma and an address range of at least one adjacent vma after the cached vma; and the thread query module 12 is configured to: when the determining module 11 determines that the vma is in the adjacent range of the cached vma, query for the vma by using a thread on a node of a threaded red-black tree, where the node is a node corresponding to the cached vma, and the thread is a pointer pointing to a predecessor node and a successor node of each node on the threaded red-black tree.

The apparatus in this embodiment may be configured to execute the method provided in the method embodiment shown in FIG. 1. Implementation principles and technical effects of the apparatus are similar to those of the method, and details are not described here again.

Figure 8:
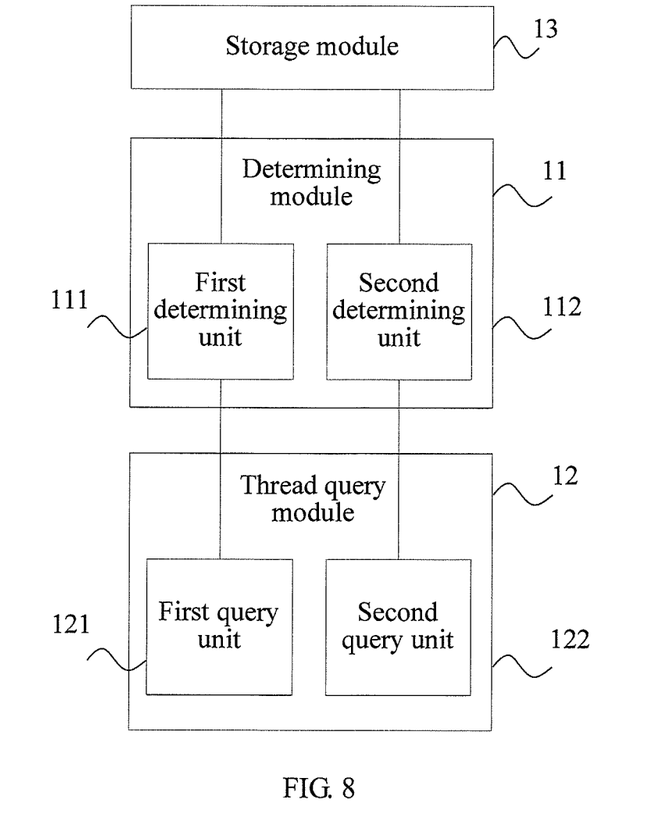
FIG. 8 is a schematic structural diagram of an apparatus for querying for a virtual memory area according to Embodiment 2 of the present invention.

FIG. 8 is a schematic structural diagram of Embodiment 2 of an apparatus for querying for a virtual memory area according to the present invention. As shown in FIG. 8, based on the apparatus shown in FIG. 7, the apparatus in this embodiment may further include a storage module 13. The storage module 13 is configured to store an adjacent range of a cached vma, where a start address in the adjacent range of the cached vma is an end address of an adjacent vma that precedes an adjacent vma before the cached vma, and an end address in the adjacent vma range is an end address of an adjacent vma after the cached vma. The determining module 11 may specifically include a first determining unit 111 and a second determining unit 112. The first determining unit 111 is configured to: if a query address is between the end address of the adjacent vma that precedes the adjacent vma before the cached vma and the end address of the adjacent vma before the cached vma, determine that the vma corresponding to the query address is the adjacent vma before the cached vma. The second determining unit 112 is configured to: if the query address is between an end address of the cached vma and the end address of the adjacent vma after the cached vma, determine that the vma corresponding to the query address is the adjacent vma after the cached vma.

The thread query module 12 may specifically include a first query unit 121 and a second query unit 122. The first query unit 121 is configured to: if the first determining unit determines that the vma corresponding to the query address is the adjacent vma before the cached vma, search for a predecessor node of the cached vma according to the thread on the node of the threaded red-black tree, and search for the vma according to the predecessor node. The second query unit 122 is configured to: if the second determining unit determines that the vma corresponding to the query address is the adjacent vma after the cached vma, search for a successor node of the cached vma according to the thread on the node of the threaded red-black tree, and search for the vma according to the successor node.

The apparatus in this embodiment may be configured to execute the method provided in the method embodiment shown in FIG. 2. Implementation principles and technical effects of the apparatus are similar to those of the method, and details are not described here again.

Figure 9:
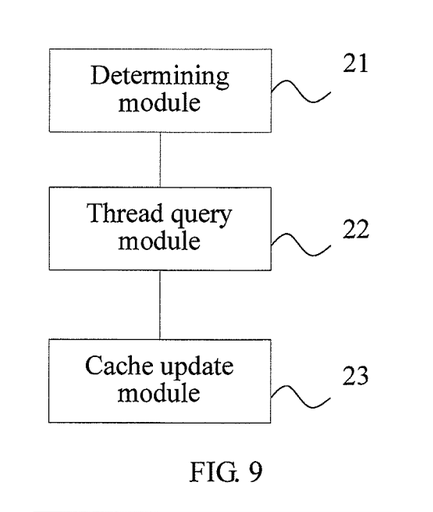
FIG. 9 is a schematic structural diagram of an apparatus for traversing a virtual memory area according to Embodiment 1 of the present invention.

FIG. 9 is a schematic structural diagram of Embodiment 1 of an apparatus for traversing a virtual memory area according to the present invention. As shown in FIG. 9, the apparatus in this embodiment may include a determining module 21, a thread query module 22, and a cache update module 23, where:

the determining module 21 is configured to determine whether a virtual memory area vma corresponding to a query address n is in an adjacent range of a cached vma, where the adjacent range of the cached vma includes an address range of at least one adjacent vma before the cached vma and an address range of at least one adjacent vma after the cached vma;

the thread query module 22 is configured to: when the determining module 21 determines that the vma is in the adjacent range of the cached vma, query for the vma by using a thread on a node of a threaded red-black tree, where the node is a node corresponding to the cached vma, and the thread is a pointer pointing to a predecessor node and a successor node of each node on the threaded red-black tree; and the cache update module 23 is configured to: according to the vma that is corresponding to the query address n and that is queried for by the thread query module 22, update the current cached vma to an address range (vma_start, vma_end) of the vma corresponding to the query address n, and update a query address n+1 to the vma_end of the vma corresponding to the query address n, where the vma_start is a start address of the vma corresponding to the query address n, and the vma_end is an end address of the vma corresponding to the query address n.

The apparatus in this embodiment may be configured to execute the method provided in the method embodiment shown in FIG. 5. Implementation principles and technical effects of the apparatus are similar to those of the method, and details are not described here again.

Figure 10:
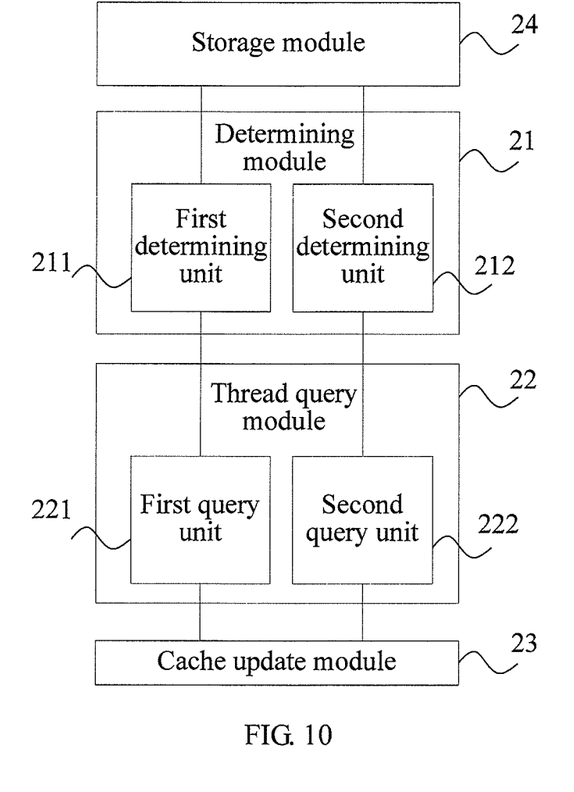
FIG. 10 is a schematic structural diagram of an apparatus for traversing a virtual memory area according to Embodiment 2 of the present invention.

FIG. 10 is a schematic structural diagram of Embodiment 2 of an apparatus for traversing a virtual memory area according to the present invention. As shown in FIG. 10, based on the apparatus shown in FIG. 9, the apparatus in this embodiment may further include a storage module 24. The storage module 24 is configured to store an adjacent range of a cached vma, where a start address in the adjacent range of the cached vma is an end address of an adjacent vma that precedes an adjacent vma before the cached vma, and an end address in the adjacent vma range is an end address of an adjacent vma after the cached vma.

The determining module 21 specifically further includes a first determining unit 211 and a second determining unit 212. The first determining unit 211 is configured to: if a query address n is between the end address of the adjacent vma that precedes the adjacent vma before the cached vma and an end address of the adjacent vma before the cached vma, determine that the vma corresponding to the query address n is the adjacent vma before the cached vma. The second determining unit 212 is configured to: if the query address n is between an end address of the cached vma and the end address of the adjacent vma after the cached vma, determine that the vma corresponding to the query address n is the adjacent vma after the cached vma.

The thread query module 22 specifically further includes a first query unit 221 and a second query unit 222. The first query unit 221 is configured to: if the first determining unit 211 determines that the vma corresponding to the query address n is the adjacent vma before the cached vma, search for a predecessor node of the cached vma according to the thread on the node of the threaded red-black tree, and search for the vma according to the predecessor node. The second query unit 222 is configured to: if the second determining unit 212 determines that the vma corresponding to the query address n is the adjacent vma after the cached vma, search for a successor node of the cached vma according to the thread on the node of the threaded red-black tree, and search for the vma according to the successor node.

The apparatus in this embodiment may specifically be configured to execute the method provided in the method embodiment shown in FIG. 6. Implementation principles and technical effects of the apparatus are similar to those of the method, and details are not described here again.

Finally, it should be noted that the foregoing embodiments are merely intended for describing the technical solutions of the present invention other than limiting the present invention. Although the present invention is described in detail with reference to the embodiments, a person of ordinary skill in the art should understand that they may still make modifications to the technical solutions described in the foregoing embodiments or make equivalent replacements can still be made to some technical features thereof, without departing from the spirit and scope of the present invention.

What is claimed is:

1. A method for querying for a virtual memory area, the method comprising:

determining whether a virtual memory area (vma) corresponding to a query address is in an adjacent range of a cached vma, wherein the adjacent range of the cached vma comprises an address range of at least one adjacent vma before the cached vma and an address range of at least one adjacent vma after the cached vma; and if the vma corresponding to the query address is in the adjacent range of the cached vma, querying for the vma by using a thread on a node of a threaded red-black tree, wherein the node is a node corresponding to the cached vma, and the thread is a pointer pointing to a predecessor node and a successor node of each node on the threaded red-black tree.

2. The method according to claim 1, wherein a start address in the adjacent range of the cached vma is an end address of an adjacent vma that precedes an adjacent vma before the cached vma, and an end address in the adjacent range of the cached vma is an end address of an adjacent vma after the cached vma.

3. The method according to claim 2, wherein determining whether a vma corresponding to a query address is in an adjacent range of a cached vma comprises:
if the query address is between the start address in the adjacent range of the cached vma and the end address in the adjacent range of the cached vma, determining that the vma corresponding to the query address is in the adjacent range of the cached vma.

4. The method according to claim 3, wherein determining whether a vma corresponding to a query address is in an adjacent range of a cached vma comprises:
if the query address is between the end address of the adjacent vma that precedes the adjacent vma before the cached vma and an end address of the adjacent vma before the cached vma, determining that the vma corresponding to the query address is the adjacent vma before the cached vma; and
if the query address is between an end address of the cached vma and the end address of the adjacent vma after the cached vma, determining that the vma corresponding to the query address is the adjacent vma after the cached vma.

5. The method according to claim 4, wherein querying for the vma by using a thread on a node of a threaded red-black tree comprises:
if the vma corresponding to the query address is the adjacent vma before the cached vma, searching for a predecessor node of the cached vma by using the thread on the node of the threaded red-black tree, and searching for the vma according to the predecessor node; and
if the vma corresponding to the query address is the adjacent vma after the cached vma, searching for a successor node of the cached vma by using the thread on the node of the threaded red-black tree, and searching for the vma according to the successor node.

6. A method for traversing a virtual memory area (vma), the method comprising:
obtaining a read semaphore of memory description information (mm), and determining whether a vma corresponding to a query address n is in an adjacent range of a cached vma, wherein the adjacent range of the cached vma comprises an address range of at least one adjacent vma before the cached vma and an address range of at least one adjacent vma after the cached vma;
if the vma corresponding to the query address is in the adjacent range of the cached vma, querying for the vma corresponding to the query address n by using a thread on a node of a threaded red-black tree, and releasing the read semaphore, wherein the node is a node corresponding to the cached vma, and the thread is a pointer pointing to a predecessor node and a successor node of each node on the threaded red-black tree;
updating an address range of the current cached vma to an address range (vma_start, vma_end) of the vma corresponding to the query address n, and updating a query address n+1 to the vma_end of the vma corresponding to the query address n, wherein the vma_start is a start address of the vma corresponding to the query address n, and the vma_end is an end address of the vma corresponding to the query address n;
obtaining the read semaphore of the mm, determining that a vma corresponding to the query address n+1 is an adjacent vma after the current cached vma, querying for a successor node of the current cached vma by using a thread on a node of the threaded red-black tree, and querying for the vma corresponding to the query address n+1 according to the successor node; and
repeating the foregoing steps cyclically until at least a part of address space is traversed.

7. The method according to claim 6, wherein a start address in the adjacent range of the cached vma is an end address of an adjacent vma that precedes an adjacent vma before the cached vma, and an end address in the adjacent vma range is an end address of an adjacent vma after the cached vma.

8. The method according to claim 7, wherein determining whether a vma corresponding to a query address n is in an adjacent range of a cached vma comprises:
if the query address n is between the start address in the adjacent range of the cached vma and the end address in the adjacent range of the cached vma, determining that the vma corresponding to the query address n is in the adjacent range of the cached vma.

9. The method according to claim 8, wherein determining whether a vma corresponding to a query address n is in an adjacent range of a cached vma comprises:
if the query address n is between the end address of the adjacent vma that precedes the adjacent vma before the cached vma and an end address of the adjacent vma before the cached vma, determining that the vma corresponding to the query address n is the adjacent vma before the cached vma; and
if the query address n is between an end address of the cached vma and the end address of the adjacent vma after the cached vma, determining that the vma corresponding to the query address n is the adjacent vma after the cached vma.

10. The method according to claim 9, wherein querying for the vma by using a thread on a node of a threaded red-black tree comprises:
if the vma corresponding to the query address n is the adjacent vma before the cached vma, searching for a predecessor node of the cached vma by using the thread on the node of the threaded red-black tree, and searching for the vma according to the predecessor node; and
if the vma corresponding to the query address n is the adjacent vma after the cached vma, searching for a successor node of the cached vma by using the thread on the node of the threaded red-black tree, and searching for the vma according to the successor node.

11. An apparatus for querying for a virtual memory area, the apparatus comprising:
a determining module, configured to determine whether a virtual memory area (vma) corresponding to a query address is in an adjacent range of a cached vma, wherein the adjacent range of the cached vma comprises an address range of at least one adjacent vma before the cached vma and an address range of at least one adjacent vma after the cached vma; and
a thread query module, configured to: when the determining module determines that the vma is in the adjacent range of the cached vma, query for the vma by using a thread on a node of a threaded red-black tree, wherein the node is a node corresponding to the cached vma, and the thread is a pointer pointing to a predecessor node and a successor node of each node on the threaded red-black tree.

12. The apparatus according to claim 11, further comprising:
a storage module, configured to store the adjacent range of the cached vma, wherein a start address in the adjacent range of the cached vma is an end address of an adjacent vma that precedes an adjacent vma before the cached vma, and an end address in the adjacent vma range is an end address of an adjacent vma after the cached vma.

13. The apparatus according to claim 11, wherein the determining module comprises:
- a first determining unit, configured to: if the query address is between an end address of an adjacent vma that precedes an adjacent vma before the cached vma and an end address of the adjacent vma before the cached vma, determine that the vma corresponding to the query address is the adjacent vma before the cached vma; and
- a second determining unit, configured to: if the query address is between an end address of the cached vma and an end address of an adjacent vma after the cached vma, determine that the vma corresponding to the query address is the adjacent vma after the cached vma.

14. The apparatus according to claim 13, wherein the thread query module comprises:
- a first query unit, configured to: if the first determining unit determines that the vma corresponding to the query address is the adjacent vma before the cached vma, search for a predecessor node of the cached vma according to the thread on the node of the threaded red-black tree, and search for the vma according to the predecessor node; and
- a second query unit, configured to: if the second determining unit determines that the vma corresponding to the query address is the adjacent vma after the cached vma, search for a successor node of the cached vma according to the thread on the node of the threaded red-black tree, and search for the vma according to the successor node.

15. An apparatus for traversing a virtual memory area, wherein the apparatus comprises:
- a determining module, configured to determine whether a virtual memory area (vma) corresponding to a query address n is in an adjacent range of a cached vma, wherein the adjacent range of the cached vma comprises an address range of at least one adjacent vma before the cached vma and an address range of at least one adjacent vma after the cached vma;
- a thread query module, configured to: when the determining module determines that the vma is in the adjacent range of the cached vma, query for the vma by using a thread on a node of a threaded red-black tree, wherein the node is a node corresponding to the cached vma, and the thread is a pointer pointing to a predecessor node and a successor node of each node on the threaded red-black tree; and
- a cache update module, configured to: according to the vma that is corresponding to the query address n and that is queried for by the thread query module, update the current cached vma to an address range (vma_start, vma_end) of the vma corresponding to the query address n, and update a query address n+1 to the vma_end of the vma corresponding to the query address n, wherein the vma_start is a start address of the vma corresponding to the query address n, and the vma_end is an end address of the vma corresponding to the query address n.

16. The apparatus according to claim 15, further comprising:
- a storage module, configured to store the adjacent range of the cached vma, wherein a start address in the adjacent range of the cached vma is an end address of an adjacent vma that precedes an adjacent vma before the cached vma, and an end address in the adjacent vma range is an end address of an adjacent vma after the cached vma.

17. The apparatus according to claim 16, wherein the determining module comprises:
- a first determining unit, configured to: if the query address n is between the end address of the adjacent vma that precedes the adjacent vma before the cached vma and an end address of the adjacent vma before the cached vma, determine that the vma corresponding to the query address n is the adjacent vma before the cached vma; and
- a second determining unit, configured to: if the query address n is between an end address of the cached vma and the end address of the adjacent vma after the cached vma, determine that the vma corresponding to the query address n is the adjacent vma after the cached vma.

18. The apparatus according to claim 17, wherein the thread query module comprises:
- a first query unit, configured to: if the first determining unit determines that the vma corresponding to the query address n is the adjacent vma before the cached vma, search for a predecessor node of the cached vma according to the thread on the node of the threaded red-black tree, and search for the vma according to the predecessor node; and
- a second query unit, configured to: if the second determining unit determines that the vma corresponding to the query address n is the adjacent vma after the cached vma, search for a successor node of the cached vma according to the thread on the node of the threaded red-black tree, and search for the vma according to the successor node.

* * * * *